(No Model.)
C. H. THURSTON.
SUSPENSION HOOK.
No. 490,996. Patented Jan. 31, 1893.
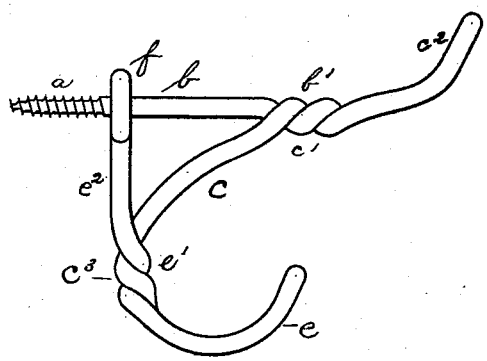
Fig I
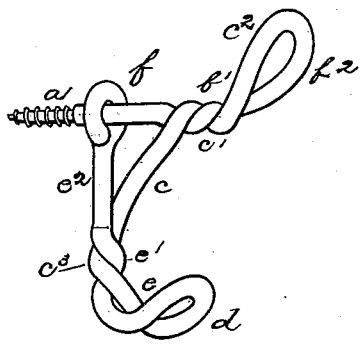
Fig II
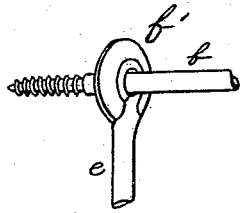
Fig III
WITNESSES
Robert Aldrich
W. G. Davis
INVENTOR
Charles H. Thurston

UNITED STATES PATENT OFFICE.

CHARLES H. THURSTON, OF BOSTON, MASSACHUSETTS, ASSIGNOR TO FRANK W. THURSTON, OF SAME PLACE.

SUSPENSION-HOOK.

SPECIFICATION forming part of Letters Patent No. 490,996, dated January 31, 1893.

Application filed October 19, 1891. Serial No. 409,140. (No model.)

*To all whom it may concern:*

Be it known that I, CHARLES H. THURSTON, of Boston, Massachusetts, have invented a new and useful Improvement in Suspension-Hooks, of which the following is a full, clear, and exact description, reference being had to the accompanying drawings, sufficient to enable one skilled in the art to make and use my invention.

In the drawings, Figure I is a side elevation. Fig. II is a perspective, and Fig. III is a partial view of a modification of the present invention.

This invention belongs to the class of wire suspension hooks having two branches and provided with a screw shank which have lately become popular. It is the outcome of a series of studies and trials with many different forms of wire hooks with screw shanks which began with the hook patented to me October 11, 1875, No. 168,682. It has two suspension members, an upper and a lower, each terminated with an eye of somewhat kiteshape, each of these members is double at its outer portion, single at its inner portion, is twisted in its middle portion, and the twisted portions of the two members are united by an inclined brace. The end of the wire farthest from the screw shank is by bending brought up to, and is wrapped around the arm of the upper member close to the screw shank and locked on it, forming a rigid base. The twisted part of the lower member is bent forward so as to be a little in front of the vertical part of the lower suspension member, and so will not mar the slat into which the hook is screwed.

In the drawings, $a$ is the screw shank.

$b$ is the arm of the upper suspension member.

$b'$ $c'$ is the twist in the middle of the upper suspension member.

$b^2$ $c^2$ is the return bend or loop at the outer end of the upper suspension member, (the two sides of this loop lie in the same transverse plane).

$c$ is the brace from the middle of the upper to the middle of the lower suspension member, locked on to each by the twists $b'$ $c'$ of the upper and $c^3$ $e'$ of the lower suspension member.

$d$ $e$ is the return bend or loop at the outer end of the lower suspension member.

$e'$ $c^3$ is the twist in the middle of the lower suspension member, it is located a little in front of the vertical part $e^2$, which extends from the twist to the arm $b$ and is tightly wrapped around it to form the clasp $f$. This part may be a flattened base $f'$, as has been already made. By fixing firmly the three points of where the shank and free end are brought together, $b'$ $c'$ where the horizontal arm and the brace $c$ are united, and $e'$ $c^3$ where the two parts of the lower suspension member are united, and $f$, where the horizontal and vertical parts are united a very solid and stiff hook is made.

The Thurston hook patented October 11, 1875, No. 168,682, was twisted throughout its length, and this is not, and did not show the brace $c$ as this does.

The Beals hook patented April 10, 1888, No. 380,974, did not have the screw shank continuous with the arm, it did not have open ends to the suspension members, the two parts of the return bends at the ends of the suspension members were in the same vertical planes, there was no twist in the upper member, the twist of the lower member ran clear to the screw shank, the free end of the wire was not formed into a loop and wrapped around the horizontal arm, and the lower end of the brace was not twisted, but was embraced by a twist of other parts. It therefore differs widely from this hook and necessarily takes about as much more wire as the distance of the lower end of the brace from the horizontal arm.

The patent granted to the applicant June 30, 1891, No. 454,891, shows a hook, the lower member of which is slightly twisted in the center of its vertical section so as to form a brace between the end of the upper member and this point in the lower member, and not elsewhere, but the present construction allows a more sightly and convenient construction of the upper member at its outer end and by having the return bend of the outer end of the hook in a horizontal plane, and the bracing between the center of the upper member and the center of the vertical part of the lower member is also considered more convenient and sightly than the long brace that extends to the outer end of the upper member as described and shown in the patent referred to. It is also believed to make the parts more rigid on account of the locking together, caused by the twisting of the parts as described.

I do not claim anything shown in the patents referred to.

It will be observed that as the lower twist is offset forward the hook will be attached to its support without forming any rings or disfiguring marks upon the surface to which it is attached. And this is an important advantage compared to the hooks to which reference has been made, and in which there are projecting sections which are brought into contact with the surface of the thing to which they are attached which form rings or disfiguring marks upon the surface of the thing to which the hook is secured before it is screwed up tightly into place.

It will be observed that the parts of this hook are rigidly fastened together at three points, one at the base of the hook, where the vertical branch of the lower arm is clasped to the horizontal branch of the upper arm close to the screw shank, one about half way out on the horizontal branch of the upper arm, where it is united to the inclined branch or brace which is coming back from the return bend in the upper arm, and one where this inclined branch or brace unites with the vertical branch of the lower member, about half way down from the horizontal branch of the upper member to the concave of the lower member, and this forms a triangular truss, with three rigidly fixed connections, which makes the parts of the hook practically immovable in relation to each other under any strain of use.

I claim and desire to secure by Letters Patent,

A hook formed of a single, continuous piece of wire and consisting of a screw shank $a$, a horizontal arm $b$ continuous with said screw shank, a hook portion consisting of the return bend or loop $b^2 c^2$, a second hook consisting of the return bend or loop $d\ e$, a single vertical portion $e^2$ the upper end of which is tightly locked upon the horizontal arm $b$, and the inclined brace $c$ locked to the horizontal arm $b$ and to the vertical portion or arm $e^2$, at or about the centers of their respective lengths, by being intertwisted therewith, the whole of the twist of the wire forming the lock between the said inclined brace and the said vertical portion or arm $e^2$ of the lower member being in front of a plane which coincides with the back surface of the said vertical portion or arm.

CHARLES H. THURSTON.

Witnesses:
F. F. RAYMOND, 2d,
J. M. DOLAN.